United States Patent [19]

Schwuchow et al.

[11] 4,057,263
[45] Nov. 8, 1977

[54] VEHICLE FRAME

[75] Inventors: Norbert Schwuchow, Sindelfingen; Gerhard Burk, Magstadt; Dietrich Rothacker, Sindelfingen, all of Germany

[73] Assignee: Daimler-Benz Aktiengesellschaft, Germany

[21] Appl. No.: 639,903

[22] Filed: Dec. 11, 1975

[30] Foreign Application Priority Data

Dec. 17, 1974 Germany .............................. 2459519

[51] Int. Cl.² .............................................. B62D 27/04
[52] U.S. Cl. ................................ 280/106 R; 296/28 F
[58] Field of Search .................. 280/106 R, 106 T, 7; 296/28 F, 28

[56] References Cited

U.S. PATENT DOCUMENTS

| 3,547,463 | 12/1970 | Eggert | 280/106 R |
| 3,794,348 | 2/1974 | Fischer | 280/106 R |
| 3,811,698 | 5/1974 | Glance | 280/106 R |
| 3,912,295 | 10/1975 | Eggert | 280/106 R |

Primary Examiner—Philip Goodman
Attorney, Agent, or Firm—Craig & Antonelli

[57] ABSTRACT

A vehicle frame consisting of longitudinal bearers with hollow profile which are interconnected near their ends by at least one transversely extending element; at least one of the edges of the longitudinal bearers is provided with intentionally weakened places for reducing the compressive strength in the end areas, which are constructed as beads or corrugations that extend preferably in the vehicle transverse direction; the beads or corrugations may thereby have their greatest depth in the area of the edges and after reaching the bearer walls adjoining on both sides thereof, run out in the plane thereof.

17 Claims, 6 Drawing Figures

VEHICLE FRAME

The present invention relates to a vehicle frame, consisting of longitudinal bearers with hollow profile, which are connected with each other by at least one element extending transversely at the end side, whereby at least one of the edges of the longitudinal bearers is provided with weakened places in the end areas at predetermined distances for purposes of reducing the compressive strength.

Such a bearer connection is already disclosed in the German Auslegeschrift No. 1,801,960 whereby holes are provided as weakening means within the end areas of the longitudinal bearers, which with a nearly unchanged bending strength, lead to a decrease of the compressive strength. Since an interruption of the material cross section takes place by the holes or apertures, the torsional strength of the bearer and therewith also of the frame is impaired. However, such attendant negative phenomena cannot be accepted especially when the bearer connection has to absorb support forces which may stem, for example, from an engine support and/or wheel suspension. The known type of weakening means entails additional disadvantages. Thus, the instant of the buckling is strongly dependent on the sheet metal thickness which leads to the fact that an apertured bearer with slight wall thickness can no longer fulfill with sufficient certainty the task ascribed thereto.

Further disadvantages also stem from the fact that an additional machining or manufacturing operation is required by the perforating or punching operation. It cannot be precluded thereby, however, that cracking places occur at the edge of the holes or apertures which expand and become enlarged during the driving operation and which lead therewith to a non-predictable excessive weakening of the frame. However, the assurance is thereby also lost that in case of an impact, a deformation in the predetermined direction takes place.

Finally, an apertured bearer offers an access possibility for dirt and moisture which readily leads to an uncontrollable corrosion of these bearer parts, and whose hollow space sealing, realized by means of costly operational processes, becomes again partly ineffectual.

It is the aim of the present invention to provide an aimed-at deformable vehicle frame which does not exhibit the aforementioned disadvantages and which in particular maintains far-reachingly its deformation characteristics over the length of life of the vehicle.

Accordingly, a vehicle frame is proposed consisting of longitudinal bearers with hollow profile which are connected with each other at the end thereof by at least one transversely extending element, whereby at least one of the edges of the longitudinal bearers are provided with weakening places within the end areas at predetermined distances for purposes of reducing the compressive strength, whereby according to the present invention, the weakened places are constructed as beads or stiffening corrugations which extend preferably in the vehicle transverse direction, and whereby the beads or corrugations have their largest depth dimension within the area of the edges and, after reaching the bearer walls adjoining on both sides, run out in the plane thereof.

A particularly low value of the compressive strength which lies on the safe side, can be achieved if the shape and form of the beads or corrugations and the minimum wall thickness thereof are so matched to the respective material that during the manufacture, the permissive tensile limit is exceeded only insignificantly during the manufacture in the boundary case whereas the breaking or rupture point is not attained with a safe margin.

The fold direction and the fold formation can be influenced favorably in that the depth of the beads or corrugations increases toward the end of the longitudinal bearer, and the termination thereof extends further into the plane of the bearer walls.

It may bring about advantages from case to case if the beads or corrugations are pressed into and/or out of the longitudinal bearer. If the bearer walls are approximately at right angle to one another, then it is more simple to press the beads or corrugations inwardly. In contrast thereto, it is readily possible in the end areas which subtend an acute angle, to press the beads or corrugations outwardly. The interior space of the bearer is thereby not impaired so that built-in parts such as, for example, shock dampers of shock absorbers, can retract unimpairedly.

Accordingly, it is an object of the present invention to provide a vehicle frame which avoids by simple means the aforementioned shortcomings and drawbacks encountered in the prior art.

Another object of the present invention resides in a vehicle frame provided with intentional weakened places to assure a predetermined deformation which, however, does not impair its torsional strength.

A further object of the present invention resides in a vehicle frame which is provided with intended weakened places yet is capable to safely absorb all forces to be absorbed by the frame.

Still another object of the present invention resides in a vehicle frame which can be manufactured in a relatively simple and inexpensive manner, minimizing any extra manufacturing steps required therefor.

Another object of the present invention resides in a vehicle frame in which the danger of crack formation along the edges of holes is avoided together with uncontrollable corrosion of the parts of the frame due to the penetration of dirt and/or moisture.

A still further object of the present invention resides in a vehicle frame which far-reachingly preserves its deformation characteristics over the entire length of life of the vehicle.

These and further objects, features and advantages of the present invention will become more apparent from the following description when taken in connection with the accompanying drawing which shows, for purposes of illustration only, two embodiments in accordance with the present invention, and wherein.

Figure 1:
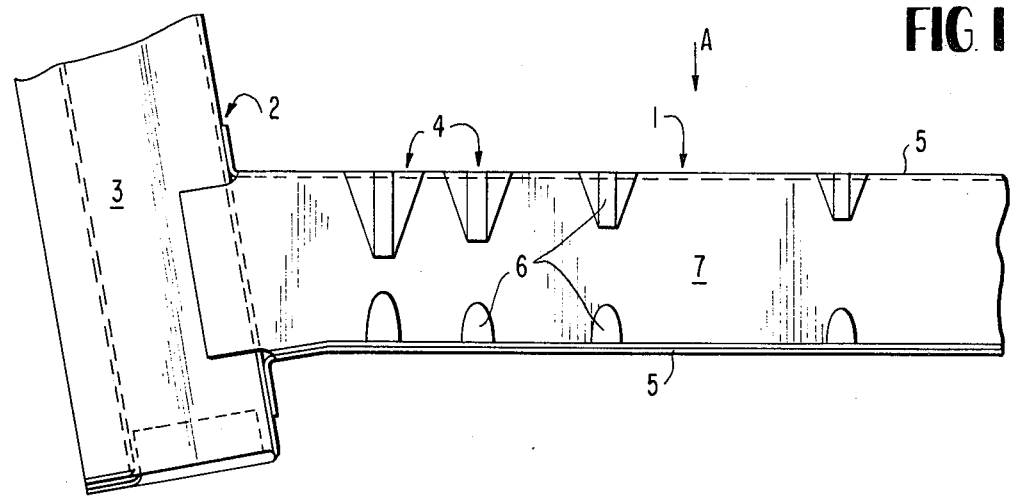
FIG. 1 is a plan view on a longitudinal bearer in accordance with the present invention with a cross bearer starting therefrom.
Figure 2:
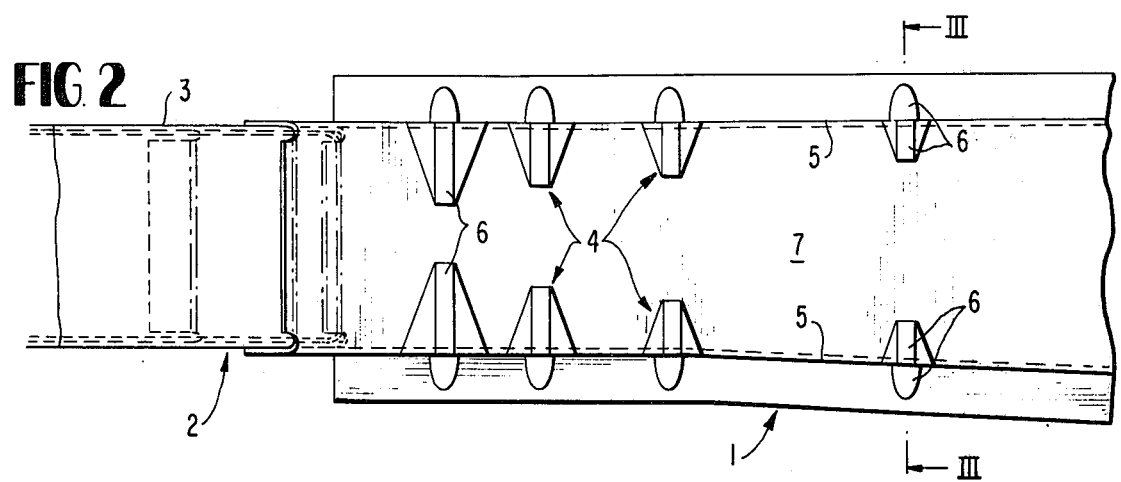
FIG. 2 is a side elevational view, taken in the direction of arrow "A" of FIG. 1.

Referring now to the drawing wherein like reference numerals are used throughout the various views to designate like parts, and more particularly to FIGS. 1 and 2, a longitudinal bearer generally designated by reference numeral 1 is connected with a second longitudinal bearer (not shown) by way of an approximately transversely extending generally designated by reference numeral 2 which is constructed as cross bearer 3 and which is secured at the end of the longitudinal bearer 1. By the use of this arrangement, a torsion- and bending-resistant vehicle frame is created by means of a bearer connection, which may have the same construction both in the front as also in the rear area of a motor vehicle (not shown). Such a frame is most suited to absorb support forces, for example, engine support forces.

Figure 3:
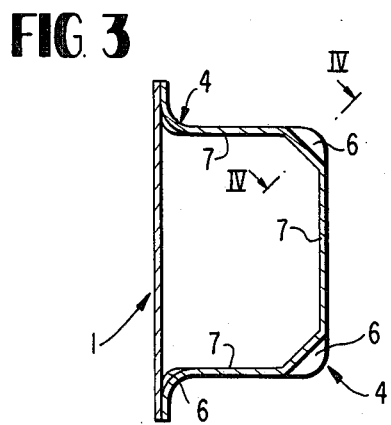
FIG. 3 is a cross-sectional view taken along line III—III of FIG. 2.
Figure 5:
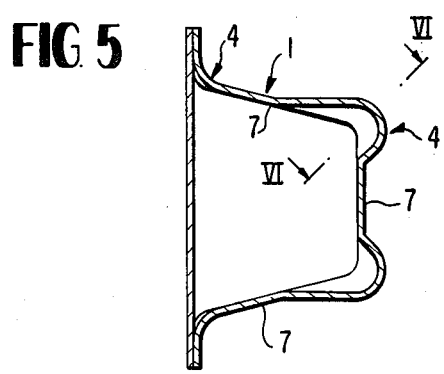
FIG. 5 is a cross-sectional view, similar to FIG. 3, through a modified embodiment of a bearer with inwardly inclined side walls and with pressed-out beads or corrugations.
Figure 4:
FIG. 4 is a cross-sectional view taken along line IV—IV of FIG. 3.
Figure 6:
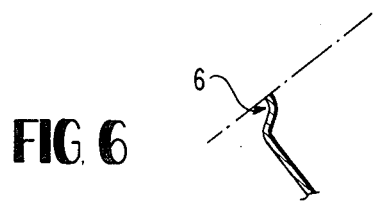
FIG. 6 is a cross-sectional view taken along line VI—VI of FIG. 5.

In order to attain an additional energy absorption in case of a vehicle impact, which starts appropriately when the absorption capability of the bumper and of outer body panel parts yielding to buckling and indentations is exhausted, the longitudinal bearer 1 having a hollow profile is provided in its end areas with weakened places generally designated by reference numeral 4, of which only a few have been designated by the reference numerals for the sake of clarity. These weakened places 4 are located at cross-sectional places with maximum compressive strength—which are represented in the illustrated embodiment by the edges 5—and are constructed as beads or corrugations 6 which, depending on the construction of the lateral bearer wall 7 are pressed into the longitudinal bearer 1 (FIGS. 3 and 4) or are partly pressed out of the same (FIGS. 5 and 6). The beads or corrugations 6 which are disposed preferably in a single plane have different spacings from the other beads or corrugations 6 whereby as a rule the distances decrease toward the end of the longitudinal bearer.

Also, the shape of the beads or corrugations 6 may be varied in numerous ways—as can be seen from the different figures—whereby, however, attention must be paid that during the deformation operation the breakage or rupture limit related to the used material is not attained with certainty. It is possible by taking into consideration the aforementioned influencing magnitudes to create a bearer connection with predetermined compressive strength whose fold location is predetermined in case of compression or buckling.

More specifically, the shape of the beads or corrugations 6 and the minimum wall thickness thereof are preferably so matched to the respective material that during the manufacture, in the boundary case, the permissive tensional limit is exceeded only significantly whereas the breakage or rupture limit is not attained with a relatively wide safety margin. The depth of the beads or corrugations may thereby increase in the direction toward the end of the longitudinal bearer, and the termination thereof, i.e., the running out thereof, may extend further into the plane of the bearer walls.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all those changes and modifications as are encompassed by the scope of the appended claims.

We claim:

1. A vehicle frame comprising longitudinal bearers having longitudinally extending walls defining a hollow profile, said walls intersecting at longitudinally extending edges, at least one of said edges being provided with intentionally weakened portions for reducing the compressive strength in the end area of said bearers without changing the bending and torsional strengths of said bearers, and at least one member extending transversely to said bearers and interconnecting said bearers, characterized in that said weakened portions are constructed by bead means having a configuration with a portion being of greatest extent at said edges, said bead means having lateral portions of said configuration extending from said portion of greatest extent to respective walls of said bearers forming said edges, and said lateral portions joining to said walls to be in the surface of said walls.

2. A vehicle frame according to claim 1, characterized in that said bead means generally extend in a direction transverse to the longitudinal extent of said bearers.

3. A vehicle frame according to claim 1, characterized in that said weakened portions are disposed at predetermined variable separation distances from one another 4. A vehicle frame according to claim 1, characterized in that said configuration of said bead means and minimum wall thicknesses thereof are so matched to the respective material that during manufacture in the boundary case, a permissive tensional limit is exceeded only in significantly whereas the breakage limit is not attained with substantial safety margin.

5. A vehicle frame according to claim 1, characterized in that said portions of greatest extent increase in size for said bead means toward the end of said longitudinal bearers, and said lateral portions increase in length to extend further into the surface of said walls.

6. A vehicle frame according to claim 1, characterized in that said bead means are pressed into said longitudinal bearer means.

7. A vehicle frame according to claim 1, characterized in that said bead means are pressed out of the longitudinal bearer means.

8. A vehicle frame according to claim 1, characterized in that two of said edges are provided with said bead means, said two edges each being defined by a common one of said walls.

9. A vehicle frame according to claim 8, characterized in that said bead means generally extend in a direction transverse to the longitudal extent of said bearers.

10. A vehicle frame according to claim 8, characterized in that said weakened portions are disposed at predetermined variable separation distances from one another.

11. A vehicle frame according to claim 10, characterized in that said bead means are pressed into said longitudinal bearer means.

12. A vehicle frame according to claim 10, characterized in that said bead means are pressed out of the longitudinal bearer means.

13. A vehicle frame comprising longitudinal bearers having longitudinally extending walls defining a hollow profile, said walls intersecting at longitudinally extending edges, at least one of said edges being provided with intentionally weakened portions for reducing the compressive strength in the end area of said bearers without changing the bending and torsional strengths of said bearers, and at least one member extending transversely to said bearers and interconnecting said bearers, characterized in that said weakened portions are constructed by bead means having a configuration with a portion being of greatest extent at said edges, said bead means having lateral portions of said configuration extending from said portion of greatest extent to respective walls of said bearers forming said edges, and said lateral portions joining to said walls to be in the surface of said walls, characterized in that said configuration of said bead means and minimum wall thicknesses thereof are so matched to the respective material that during manufacture in the boundary case, a permissive tensional limit is exceeded only insignificantly whereas the breakage limit is not attained with substantial safety margin and characterized in that said portions of greatest extent increase in size for said bead means toward the end of said longitudinal bearers, and said lateral portions increase in length to extend further into the surface of said walls.

14. A vehicle frame according to claim 13, characterized in that said bead means are pressed into said longitudinal bearer means.

15. A vehicle frame according to claim 13, characterized in that said bead means are pressed out of the longitudinal bearer means.

16. A vehicle frame according to claim 13, characterized in that said bead means generally extend in a direction transverse to the longitudinal extent of said bearers.

17. A vehicle frame according to claim 13, characterized in that said weakened portions are disposed at predetermined variable separation distances from one another.

* * * * *